United States Patent [19] [11] 4,183,835
Yamaguchi et al. [45] Jan. 15, 1980

[54] SALTS OF A BASIC NITROGENOUS COMPOUND AS STABILIZERS FOR NEUTRALIZED POLYAMIDE-ACID RESIN

[75] Inventors: Katsuhiko Yamaguchi; Yasuhiro Suzuki; Makoto Komima; Hiroshi Shibata, all of Ibaraki, Japan

[73] Assignee: Nitto Electric Industrial Co., Ltd., Ibaraka, Japan

[21] Appl. No.: 782,809

[22] Filed: Mar. 30, 1977

[30] Foreign Application Priority Data

Sep. 29, 1976 [JP] Japan ............................. 51/117484

[51] Int. Cl.$^2$ .......................... C08K 3/26; C08K 5/34; C08K 5/19; C08K 5/17
[52] U.S. Cl. ...................... 260/29.2 TN; 260/31.2 N; 260/33.2 R; 260/33.4 R; 260/45.8 NT; 260/45.85 A; 260/45.85 E; 260/45.9 AA; 525/5; 525/6
[58] Field of Search ................... 260/29.2 N, 31.2 N, 260/33.2 R, 33.4 R, 45.8 NT, 45.85 A, 45.85 E, 45.9 AA; 204/181 R; 526/5, 6

[56] References Cited

U.S. PATENT DOCUMENTS

| | | | |
|---|---|---|---|
| 3,507,765 | 4/1970 | Holub et al. | 260/29.2 N |
| 3,528,937 | 9/1970 | Reynolds et al. | 260/29.2 N |
| 3,537,970 | 11/1970 | Holub et al. | 260/29.2 N |
| 3,703,493 | 11/1972 | Holub | 260/29.2 N |
| 3,787,338 | 1/1974 | Skelly et al. | 260/29.2 N |
| 3,810,858 | 5/1974 | Boldebuck | 260/29.2 N |
| 4,008,195 | 2/1977 | Ishizuka et al. | 260/29.2 N |
| 4,011,361 | 3/1977 | Vassiliou et al. | 260/29.2 N |

Primary Examiner—Murray Tillman
Assistant Examiner—Arthur H. Koeckert
Attorney, Agent, or Firm—Sughrue, Rothwell, Mion, Zinn and Macpeak

[57] ABSTRACT

A method for stabilizing a water-soluble resin composition which comprises adding, as a stabilizing agent, a carbonate and/or an organic carboxylate of a basic nitrogenous compound to the water-soluble composition in an amount of from about 0.01 to about 10 parts by weight based on 100 parts by weight of the resin content in the water-soluble composition, the water-soluble composition, being prepared by condensation reacting an acid component consisting of 1,2,3,4-butane tetracarboxylic acid alone or a polycarboxylic acid component containing at least about 50 mol% of 1,2,3,4-butane tetracarboxylic acid and a diamine in the presence of a water-soluble solvent or, optionally, in the presence of the water-soluble solvent and water to obtain a condensation product having a residual acid value ratio of about 3 to about 50% of the acid value before condensation followed by formation of a salt of the condensation product with a basic nitrogenous compound.

18 Claims, No Drawings

SALTS OF A BASIC NITROGENOUS COMPOUND AS STABILIZERS FOR NEUTRALIZED POLYAMIDE-ACID RESIN

BACKGROUND OF THE INVENTION

1. Field of the Invention

The present invention relates to a method for stabilizing a water-soluble resin composition. More particularly, this invention relates to a method for stabilizing a water-soluble resin composition which comprises adding, as a stabilizing agent, a carbonate and/or an organic carboxylate of a basic nitrogenous compound to the water-soluble composition in an amount of from about 0.01 to about 10 parts by weight based on 100 parts by weight of the resin content in the water-soluble composition, the water-soluble composition being prepared by condensation reacting an acid component consisting of 1,2,3,4-butane tetracarboxylic acid alone or a polycarboxylic acid component containing at least about 50 mol% of 1,2,3,4-butane tetracarboxylic acid and a diamine in the presence of a water-soluble solvent or, if desired, in the presence of the water-soluble solvent and water to obtain a condensation product having a residual acid value ratio of about 3 to about 50% of the acid value before condensation followed by formation of a salt of the condensation product with a basic nitrogenous compound.

2. Description of the Prior Art

Heretofore, various organic solvent-type resin solutions have been developed and are used in many fields. However, organic solvent-type resin solutions involve the release of a large amount of solvent in the production steps, e.g., heating and/or drying steps, and recently have become a problem from the standpoints of environmental pollution and environmental safety. Specifically, solvents used in the fields of electrical insulating varnishes, etc., are mainly acidic or basic solvents such as cresol, xylenol, phenols, N-methyl-pyrrolidone or the like, and there are further great problems such that the deposition of the resin solution becomes inflamed.

In order to solve the above defects, attempts have been made to make the solvent for the resin solution safer, i.e., to use water as a main component of the solvent, by employing a water solubilization method, an emulsion method, etc.

In view of the above circumstances, water-soluble compositions mainly useful as electrical insulating varnishes are disclosed in Japanese Patent Application (OPI) Nos. 40632/70 (corresponding to U.S. Patent application Ser. No. 498,020, filed Aug. 16, 1974, now U.S. Pat. No. 4,008,195), 41930/70 (corresponding to U.S. Pat. No. 3,936,404) 76196/70 (corresponding to U.S. Pat. No. 3,925,313) and 37126/71 (corresponding to U.S. Patent Application Ser. No. 617,135, filed Sept. 26, 1975 now U.S. Pat. No. 4,101,488) and Japanese Patent Publication 18463/71 (corresponding to U.S. Patent Application Ser. No. 569,427, filed Apr. 18, 1975 now U.S. Pat. No. 4,014,832).

Each of those compositions shows excellent characteristics when employed as electrical insulating varnishes, but a phenomenon occurs where the viscosity of the solution increases during storage for a long period of time in the so-called water-soluble resin solution state and in the worst occasion, the practical use thereof becomes impossible due to the increase of the viscosity of the solution.

SUMMARY OF THE INVENTION

As the result of extensive investigations for preventing the above described phenomenon, the present invention has been accomplished.

Namely, the present invention provides a method for stabilizing a water-soluble resin composition which comprises adding, as a stabilizing agent, a carbonate and/or an organic carboxylate of a basic nitrogenous compound to the water-soluble composition in an amount of from about 0.01 to about 10 parts by weight based on 100 parts by weight of the resin content in the water-soluble composition, the water-soluble composition being prepared by condensation reacting an acid component consisting of 1,2,3,4-butane tetracarboxylic acid alone or a polybasic acid component containing at least about 50 mol% of 1,2,3,4-butane tetracarboxylic acid and a diamine in the presence of a water-soluble solvent or, if desired, in the presence of the water-soluble solvent and water to obtain a condensation product having a residual acid value ratio of about 3 to about 50% of the acid value before condensation followed by formation of a salt of the condensation product with a basic nitrogenous compound.

DETAILED DESCRIPTION OF THE INVENTION

The present invention can be achieved by adding, as a stabilizing agent, a carbonate and/or an organic carboxylate of a basic nitrogenous compound to a water-soluble composition which is obtained by condensing an acid component comprising 1,2,3,4-butane tetracarboxylic acid as a main component and a diamine in the presence of a water-soluble solvent or, if desired, in the presence of the water-soluble solvent and water under heating to obtain a condensation product followed by formation of a salt of the condensation product by neutralizing the condensation product with a basic nitrogenous compound.

No particular limitation exists on the concentration of the reaction solution of the acid component comprising 1,2,3,4-butane tetracarboxylic acid as the main component of the acid component and the diamine in the condensation reaction thereof, but a concentration of about 50 to about 90% by weight is preferred. If the concentration is too high, the reaction operation becomes difficult because of an increase of the viscosity on reaction, and on the other hand, if the concentration is too low, it is uneconomical because a large amount of solvent is required and further a large amount of the solvent is released in the production steps of the desired product.

The molar ratio of the diamine to the acid component comprising 1,2,3,4-butane tetracarboxylic acid as a main component ranges from about 0.55 to about 1.8 moles per mole of the acid component and the effect of the present invention for the condensation product can be obtained within the above described range. However, where the amount (ratio) of the diamine used is outside the above described range, the viscosity increase of the water-soluble composition after formation of a salt of the condensation product obtained is not marked and, therefore, it is not necessary to employ the present invention.

It is preferred for the reaction temperature to range from about 60° C. to the boiling point of the reaction solution under normal pressure.

In the above described treatment, a condensation reaction occurs and a condensation product having a residual acid value ratio of about 3 to about 50% can be produced. Hereinafter, the acid value is represented by the mg. equivalent of the carboxyl group per gram of the sample, and the residual acid value ratio means the ratio of the residual acid value after the reaction to the acid value of the carboxylic acid component in the system at the beginning of the reaction, which is set at 100%. However, in the case of carrying out the reaction in the presence of the water-soluble solvent and water, the acid value of the system excluding the water at the beginning of the reaction is considered 100%.

For the condensation product of the present invention, it is essential for the acid component to be 1,2,3,4-butane tetracarboxylic acid alone or to be a polycarboxylic acid component containing at least about 50 mol% of 1,2,3,4-butane tetracarboxylic acid. If the amount of 1,2,3,4-butane tetracarboxylic acid used is below about 50 mol%, it is not preferred because the contribution to water-solubilization becomes small.

Examples of polycarboxylic acids which can be used within the above described range together with 1,2,3,4-butane tetracarboxylic acid include di-, tri- or tetravalent aliphatic, alicyclic or aromatic polycarboxylic acids which can be used individually or as mixtures thereof. Representative examples of polycarboxylic acids which can be used include succinic acid, glutaric acid, adipic acid, pimelic acid, suberic acid, azelaic acid, sebacic acid, maleic acid, hexahydrophthalic acid, phthalic acid, isophthalic acid, terephthalic acid, trimellitic acid, 4-carboxydiphenyl-3',4'-dicarboxylic acid, 4-carboxydiphenylmethane-3',4'-dicarboxylic acid, 3-carboxydiphenylmethane-3',4'-dicarboxylic acid, 4-carboxydiphenylether-3',4'-dicarboxylic acid, 3-carboxydiphenylether-3',4'-dicarboxylic acid, 4-carboxydiphenylketone-3',4'-dicarboxylic acid, 4-carboxydiphenylsulphone-3',4'-dicarboxylic acid, pyromellitic acid, 3,3',4,4'-diphenyltetracarboxylic acid, 3,3',4,4'-benzophenonetetracarboxylic acid, 3,3',4,4'-diphenylmethanetetracarboxylic acid, 3,3',4,4'-diphenylethertetracarboxylic acid, 3,3',4,4'-diphenylsulfonetetracarboxylic acid, 1,1-bis(2,3-dicarboxyphenyl)ethane, 2,2-bis(3,4-dicarboxyphenyl)propane, 1,2,5,6-naphthalenetetracarboxylic acid, cyclopentane-1,2,3,4-tetracarboxylic acid, etc., or the anhydrides thereof, isomers thereof (e.g., where the position of the carboxyl group is changed) or the like. Those materials can be used individually or as mixtures thereof.

Suitable diamines which can be used include aliphatic, alicyclic and aromatic diamines represented by the formula $N_2N-R-NH_2$ (where R represents a divalent organic group) and mixtures thereof. However, aromatic diamines are more preferably used. Specific examples of suitable diamines are as follows: m-phenylenediamine, p-phenylenediamine, 4,4'-diaminodiphenylmethane, 4,4'-diaminodiphenylethane, 4,4'-diaminodiphenylpropane, 4,4'-diaminodiphenyl ether, 3,4'-diaminodiphenyl ether, benzidine, 3,3'-dimethoxybenzidine, 4,4'-diaminodiphenyl sulfide, 4,4'-diaminodiphenyl sulfone, 3,3'-diaminodiphenyl sulfone, p-bis(4-aminophenoxy)benzene, m-bis(4-aminophenoxy)benzene, 4,4'-diaminobiphenyl, m-xylylenediamine, p-xylylenediamine, di-(p-aminocyclohexyl) methane, hexamethylenediamine, heptamethylenediamine, octamethylenediamine, nonamethylenediamine, 4,4'-dimethylheptadiamine, 3-methoxyheptamethylenediamine, 2,11-diaminododecane, 1,4-diaminocyclohexane, 2,2'-diaminodiethyl ether, 2,2'-diaminodiethyl thioether, 3,3'-diaminodipropoxyethane, 2,6-diaminopyridine, guanamine, 2,5-diamino-1,3,4-oxadiazole, 2-(3'-aminophenyl)-5-aminobenzoxazole, bis(4-aminophenyl)phosphine oxide and bis(4-aminophenyl)diethyl silane, etc. These amines can be used individually or as a mixture thereof.

The water-soluble solvents which can be used in the present invention can be represented by the following formula (a), (b), (c) or (d):

(a) R—OH wherein R represents a monovalent organic residue of an aliphatic or alicyclic compound having 3 to 8 carbon atoms;

(b) HO—$R_1$—OH wherein $R_1$ represents (1) a divalent organic residue of an aliphatic or alicyclic compound having 3 to 8 carbon atoms, or (2) a divalent moiety having the formula

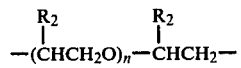

wherein n represents 0 to 5 and $R_2$ represents a hydrogen atom or a methyl group;

(c) $R_3O-(CH_2CH_2O)_m-R_4$ wherein m represents 1 to 3, $R_3$ represents a lower alkyl group having 1 to 4 carbon atoms, and $R_4$ represents a hydrogen atom or a —OOCCH$_3$ group, or $R_3$ and $R_4$ are both methyl groups; or

 (d)

wherein $R_5$ represents a glycerin or trimethylolpropane residue.

Suitable examples of water-soluble solvents of the formula (a) above are isopropyl alcohol, n-butyl alcohol, t-butyl alcohol, hexyl alcohol, cyclohexanol and the like. Suitable examples of solvents of the formula (b) above are ethylene glycol, diethylene glycol, triethylene glycol, tetraethylene glycol, other low molecular polyethylene glycols, propylene glycol, dipropylene glycol, 1,4-butanediol, 1,6-hexanediol, 1,4-cyclohexanediol and the like. Suitable examples of solvents of the formula (c) above are ethylene glycol monomethyl ether, ethylene glycol monoisopropyl ether, ethylene glycol monobutyl ether, diethylene glycol monomethyl ether, diethylene glycol monoethyl ether, diethylene glycol monoisopropyl ether, diethylene glycol monobutyl ether, triethylene glycol monomethyl ether, ethylene glycol dimethyl ether, diethylene glycol dimethyl ether, ethylene glycol monomethyl ether acetate, diethylene glycol monoethyl ether acetate and the like. Suitable examples of solvents of the formula (d) above are glycerin, trimethylolpropane and the like. Particularly preferred solvents are glycols and glycerin. These solvents can be used individually or as a mixture thereof. Further, basic solvents such as N-methyl-2-pyrrolidone, N,N-dimethylacetamide or N,N-dimethylformamide do not adversely effect the water-solubilization.

Although these water-soluble solvents can be used individually for carrying out the reaction, it is sometimes more effective operationally if the reaction is carried out in the presence of water initially.

The above described manner is limited to the case where the acid component acts as a free acid in the reaction. On the other hand, where it is intended for the reaction to use an acid anhydride as a part of the acid component, water cannot be used as a co-solvent at the reaction.

The condensation product having a residual acid value ratio of about 3 to about 50% obtained above is neutralized with the basic nitrogenous compound to form a salt of the condensation product which is water-soluble. The basic nitrogenous compound which can be used to form such a neutralized salt of the condensation product is a nitrogen compound which acts as a base and examples include ammonia, a primary amine, a secondary amine, a tertiary amine, a heterocyclic compound which acts in the same manner as a tertiary amine, a quaternary ammonium compound, or the like. Specific examples of reactive nitrogenous compounds which can be suitably used in the present invention include ammonia, ammonium hydroxide, tetraethylammonium hydroxide, tetramethylammonium hydroxide, trimethylamine, triethylamine, n-methylmorpholine, n-ethylmorpholine, pyridine, methylamine, ethylamine, diethylamine, dimethylamine, N-methyldiethanolamine, N-ethyldiethanolamine, N,N-dimethylethanolamine, N,N-diethylethanolamine, triethanolamine or the like.

In general, it is advantageous for these nitrogenous compounds to be used together with water used for diluting the water-soluble composition as desired. The preferred amount of the nitrogenous compound is about an equivalent amount to the acid value of the condensation product. The use of the nitrogenous compound in an amount greater than the necessary amount for water-solubilization is uneconomical because a large amount of the nitrogenous compound is released in the heating and drying steps at processing. However, in using a volatile nitrogenous compound such as ammonia, it is sometimes practical to use an excess amount thereof taking into consideration volatilization, etc. of such a volatile nitrogenous compound during water-solubilization.

The temperature at the formation of a salt of the condensation product ranges from about 0° to about 200° C., preferably room temperature (e.g., about 20°–30° C.) to about 120° C.

Using the above described treatment, the water-soluble composition can be easily obtained.

A characteristic feature of the present invention is to prevent an increase in viscosity of the water-soluble composition during storage thereby to stabilize the water-soluble composition by adding as a stabilizing agent a carbonate and/or an organic carboxylate of the basic nitrogenous compound to the water-soluble composition in an amount of from about 0.01 to about 10 parts by weight based on 100 parts by weight of the resin content in the water-soluble composition.

The preferred organic carboxylic acid component in the organic carboxylate used as a stabilizing agent is an organic carboxylic acid having 1 to 7 carbon atoms, such as formic acid, acetic acid, propionic acid, butyric acid, valeric acid, acrylic acid or the like.

The amount of the salt of the basic nitrogenous compound employed is within the above described range, preferably about 1 to about 5 parts by weight based on 100 parts by weight of the resin content in the water-soluble composition. If the amount of the salt is below about 0.01 parts by weight, the effect of stabilization is small and is not practical, and, on the other hand, if the amount of the salt is above about 10 parts by weight, the effect of stabilization is marked but foaming or the like at processing tends to occur.

The preferred salt of the basic nitrogenous compound added is one which is not retained in the resin after volatilization of the solvent by processing, and suitable examples thereof include a carbonate, a formate, an acetate or a propionate of ammonia; a carbonate, a formate, an acetate or a propionate of a trialkylamine such as trimethylamine, triethylamine or the like; a carbonate, a formate, an acetate or a propionate of an N-alkyldiethanolamine such as N-methyldiethanolamine, N-ethyldiethanolamine or the like; a carbonate, a formate, an acetate or a propionate of an N,N-dialkylethanolamine such as N,N-dimethylethanolamine, N,N-diethylethanolamine or the like; a carbonate, a formate, an acetate or a propionate of triethanolamine; etc. These compounds can be used individually or as mixtures thereof.

These carbonate or organic carboxylate compounds are generally added to the water-soluble composition at room temperature after production of the water-soluble composition, but may be added together with the basic nitrogenous compound for forming the salt of the condensation product during the production of the water-soluble composition or may be previously added to the condensation product for producing the water-soluble composition.

As described above, the present invention provides a stabilization of the water-soluble composition by the addition of a carbonate or organic carboxylate of a basic nitrogenous compound to the water-soluble composition.

The water-soluble composition employed in the present invention includes various kinds of condensation products obtained by the water-solubilization of high molecular weight condensation products, condensation products containing amino groups or carboxyl groups at the terminals thereof, etc., produced by varying the blending ratio of the acid component and the diamine. Further, the stabilization according to the present invention is also effective for water-soluble compositions which are obtained by mixing or partially reacting other water-soluble resin components with these condensation products. Furthermore, the water-soluble composition may contain various additives, crosslinking agents or the like.

The present invention will be illustrated in greater detail by reference to the following Examples. However, the present invention is not be construed as being limited to these Examples only. Unless otherwise indicated, all parts, percents, ratios and the like are by weight.

EXAMPLE 1

Into a 5 liter three-necked flask equipped with a thermometer, a trap condenser and a stirrer were charged 1100 g of distilled water and 700 g of ethylene glycol and the contents were heated with stirring. When the temperature was 40° to 60° C., 1170 g (5 moles) of 1,2,3,4-butane tetracarboxylic acid was charged and when the temperature was 60° to 80° C., 990 g (5 moles) of diaminodiphenylmethane was further charged. By continuing heating and stirring, when the temperature was near 100° C., water started to distil off. About 2 hours after the water started to distil off, the water charged at the beginning and water produced during the reaction had distilled off and the temperature of the reaction system reached 130° C. The acid value of the condensation product was 1.62 mg equivalent per gram (residual acid value ratio: 23.2%). Then the reaction was stopped and an aqueous ammonia solution was added at 80° to 100° C. to form an ammonium salt of the condensation product. The aqueous ammonia solution was prepared by diluting 350 g of a commercially available 28% by weight aqueous ammonia solution with 350 g of distilled water.

The resulting ammonium salt of the condensation product was diluted with distilled water to prepare a water-soluble composition having a viscosity of 20 poises (at 30° C.) and a resin content of 48.0% (on drying at 200° C. for 2 hours).

Ammonium carbonate was added to the resulting water-soluble composition in the amount shown in Table 1 below (all amounts of ammonium carbonate added are based on 100 parts of the resin content in the water-soluble composition, hereinafter the same) and was allowed to stand sealed to observe the change in viscosity with the passage of time.

The results obtained are shown in Table 1 below.

Table 1

| | Sample No. | | | | |
|---|---|---|---|---|---|
| | 1 | 2 | 3 | 4 | 5 |
| Amount of Ammonium Carbonate added (parts) | 0 | 0.1 | 1 | 5 | 10 |
| Initial Viscosity of the Water-soluble Composition (poises, at 30° C.) | 20 | 20 | 20 | 20 | 20 |
| Viscosity during Storage at 50° C. (poises, at 30° C.): | | | | | |
| After 3 days | 60 | 25 | 20 | 18.5 | 18 |
| After 5 days | 150 | 35 | 22 | 19.5 | 15.5 |
| After 10 days | 500 | 62 | 24.5 | 21 | 16 |
| After 20 days | Gel state | 150 | 28 | 21.5 | 17 |

As is apparent from the results for Sample No. 1 shown in Table 1 above, the water-soluble composition obtained according to the present Example shows inherently a marked increase in viscosity on storage for a long period of time. However, in Sample Nos. 2 to 5 to which ammonium carbonate was added in various amounts as a salt of a basic nitrogenous compound, which is a characteristic feature of the present invention, a prevention of an increase in viscosity was observed and in the present Example a sufficient effect for preventing the increase in the viscosity can be observed by addition of ammonium carbonate in an amount of 1 to 5 parts.

EXAMPLE 2

A water-soluble composition was prepared in the same manner as in Example 1. To the resulting water-soluble composition various kinds of salts of basic nitrogenous compounds as shown in Table 2 below, were added to observe the effect of preventing increases in viscosity.

The results obtained are shown in Table 2 below.

Table 2

| Sample No. | Salt Added* | Initial Viscosity (poises, at 30° C.) | Viscosity during Storage at 50° C. under Sealed Conditions (poises, at 30° C.) | | | |
|---|---|---|---|---|---|---|
| | | | After 3 Days | After 5 Days | After 10 Days | After 20 Days |
| 1 | None | 20 | 60 | 150 | 500 | Gel state |
| 3 | Ammonium Carbonate | 20 | 20 | 22 | 24.3 | 28 |
| 6 | Ammonium Formate | 20 | 21.5 | 25.3 | 29.8 | 39.3 |
| 7 | Ammonium Acetate | 20 | 24.5 | 32.3 | 45.8 | 67.3 |
| 8 | Ammonium Propionate | 20 | 30 | 41.5 | 68.5 | 110 |
| 9 | Triethanolamine Carbonate | 20 | 21.3 | 22.5 | 25.8 | 30.3 |

*Amount added: 1 part per 100 parts of resin content.

EXAMPLE 3

A condensation product was prepared in the same manner as in Example 1 except that 700 g of triethylene glycol was used instead of 700 g of ethylene glycol. The condensation product obtained had an acid value of 1.57 mg equivalent per gram (residual acid value ratio: 22.5%). Then the reaction was stopped and an aqueous triethanolamine solution was added at 70° to 80° C. to form a water-soluble composition having a viscosity of 40 poises (at 30° C.) and a resin content of 45.5% (on drying at 200° C. for 2 hours). The aqueous triethanolamine solution was prepared by diluting 669 g of triethanolamine with 700 g of distilled water.

To the resulting water-soluble composition, ammonium carbonate was added in an amount of 5 parts to observe the effect of preventing an increase in the viscosity.

The results obtained are shown in Table 3 below.

Table 3

| Sample No. | Salt Added | Initial Viscosity (poises, at 30° C.) | Viscosity during Storage at 50° C. under Sealed Conditions (poises, at 30° C.) | | | |
|---|---|---|---|---|---|---|
| | | | After 3 Days | After 5 Days | After 10 Days | After 20 Days |
| 10 | None | 40 | 80 | 200 | 800 | Gel state |
| 11 | Ammonium Carbonate | 40 | 43.2 | 48.3 | 53.5 | 60 |

As is apparent from the results in Table 3 above, even where the basic nitrogenous compound used for neutralization is different from that used for stabilization, the effect of preventing an increase in viscosity can be sufficiently observed.

EXAMPLE 4

The procedures as in Example 1 were followed except optionally controlling the reaction time to obtain water-soluble compositions having various acid values. The concentration of these water-soluble compositions were adjusted with distilled water so as to have the same resin content. Ammonium carbonate was added to the water-soluble compositions having various acid values to observe the effect of preventing an increase in the viscosity.

The results obtained are shown in Table 4 below.

having a viscosity of 6.9 poises (at 30° C.) and a resin content of 40.3% (on drying at 200° C. for 2 hours).

To each of the resulting water-soluble compositions (Sample Nos. 14 to 16) by the formation of the ammo- Table 4

| Sample No. | Residual Acid Value Ratio (Acid Value) (%) | Salt* | Initial Viscosity (poises, at 30° C.) | Viscosity during Storage at 50° C. under Sealed Conditions (poises, at 30° C.) | | | |
|---|---|---|---|---|---|---|---|
| | | | | After 3 Days | After 5 Days | After 10 Days | After 20 Days |
| 12 | 10.4 | None | 67 | 190 | 500 | Gel state | Gel state |
| | (0.73mg equivalent/g) | Added | 67 | 73 | 80 | 92 | 115 |
| 3 | 23.2 | None | 20 | 60 | 150 | 500 | Gel state |
| | (1.62mg equivalent/g) | Added | 20 | 20 | 22 | 24.3 | 28 |
| 13 | 41.7 | None | 8 | 12 | 15 | 25 | 55 |
| | (2.91mg equivalent/g) | Added | 8 | 8 | 9.5 | 10 | 11 |

*1 Part of ammonium carbonate per 100 parts of resin

EXAMPLE 5

(A) Into the same type of flask as was used in Example 1 were charged 1000 g of ethylene glycol and 693 g (3.5 moles) of 4,4'-diaminodiphenylmethane and the contents were heated to 80° C. Then, 655 g (2.8 moles) of 1,2,3,4-butane tetracarboxylic acid was added and the reaction was continued at 110°-120° C. for 30 minutes. After cooling the system to 70° C., 134 g (0.7 mole) of trimellitic anhydride was added. Thereafter, the reaction system was heated to 120° to 130° C. and the reaction was continued for 30 minutes to obtain a condensation product having an acid value of 1.12 mg per gram (residual acid value ratio: 20.9%). A 28% aqueous ammonia solution was added to form an ammonium salt of the condensation product followed by dilution with distilled water to prepare a water-soluble composition (Sample No. 14) having a viscosity of 15.0 poises (at 30° C.) and a resin content of 40.3% (on drying at 200° C. for 2 hours).

(B) The procedures as in (A) above were followed except that 153 g (0.7 mole) of pyromellitic dianhydride was used instead of trimellitic anhydride to prepare a condensation product having an acid value of 1.25 mg per gram (residual acid value ratio: 22.3%). A 28% aqueous ammonia solution was added to form an ammonium salt of the condensation product followed by dilution with distilled water to adjust the resin content thereby to prepare a water-soluble composition (Sample No. 15) having a viscosity of 17.2 poises (at 30° C.) and a resin content of 40.5% (on drying at 200° C. for 2 hours).

(C) The procedures as in (A) above were followed except that 70 g (0.7 mole) of succinic acid was used instead of trimellitic anhydride to prepare a condensation product having an acid value of 0.97 mg per gram (residual acid value ratio: 18.6%). A 28% aqueous ammonia solution was added to form an ammonium salt of the condensation product followed by dilution with distilled water to adjust the resin content thereby to prepare a water-soluble composition (Sample No. 16)

having a viscosity of 6.9 poises (at 30° C.) and a resin content of 40.3% (on drying at 200° C. for 2 hours).

To each of the resulting water-soluble compositions (Sample Nos. 14 to 16) by the formation of the ammonium salt, 1 part (per 100 parts of the resin content) of ammonium carbonate was added to measure the effects of preventing an increase in the viscosity.

For the sake of comparison, the increase of the viscosity where no salt was added was also measured.

The results obtained are shown in Table 5 below.

Table 5

| Sample No. | Salt | Initial Viscosity (poises, at 30° C.) | Viscosity during Storage at 50° C. under Sealed Conditions (poises, at 30° C.) | | | |
|---|---|---|---|---|---|---|
| | | | After 3 Days | After 5 Days | After 10 Days | After 20 Days |
| 14 | None | 15 | 24 | 27 | 58 | 200 |
| | Added | 15 | 15 | 16 | 18 | 20.5 |
| 15 | None | 17 | 25 | 30 | 63 | 250 |
| | Added | 17 | 16.5 | 17.5 | 18.5 | 21 |
| 16 | None | 6.9 | 10 | 12 | 24 | 80 |
| | Added | 6.9 | 6.8 | 6.8 | 6.9 | 7.1 |

As is apparent from the results in Table 5 above, a sufficient effect in preventing an increase in the viscosity can be observed even in the use of other various polycarboxylic acids together with 1,2,3,4-butane tetracarboxylic acid as an acid component.

While the invention has been described in detail and with reference to specific embodiments thereof, it will be apparent to one skilled in the art that various changes and modifications can be made therein without departing from the spirit and scope thereof.

What is claimed is:

1. A method for stabilizing a water-soluble composition of a resin which comprises adding, as a stabilizing agent, a carbonate, a formate, an acetate or a propionate of a basic nitrogenous compound selected from the group consisting of ammonia, a primary amine, a secondary amine, a tertiary amine, a heterocyclic compound which acts as a tertiary amine, a quaternary ammonium compound or a mixture thereof, to the water-soluble composition in an amount of from about 0.01 to about 10 parts by weight based on 100 parts by weight of the content of the resin in the water-soluble composition, said water-soluble resin composition being prepared by condensation reacting (i) an acid component consisting of 1,2,3,4-butane tetracarboxylic acid alone or a polycarboxylic acid component containing at least about 50 mol% of 1,2,3,4-butane tetracarboxylic acid and (ii) a diamine in the presence of a water-soluble solvent or, optionally in the presence of a water-soluble solvent and water, to obtain a condensation product having a residual acid value ratio of about 3 to about 50% of the acid value after condensation followed by formation of a salt of the condensation product with a basic nitrogeneous compound.

2. The method as claimed in claim 1, wherein the amount of said diamine is about 0.55 to 1.8 moles per mole of the acid component.

3. The method as claimed in claim 1, wherein said acid component is said acid component containing at least about 50 mol% of 1,2,3,4-butane tetracarboxylic acid and at least one other di-, tri- or tetravalent carboxylic acid.

4. The method as claimed in claim 1, wherein the amount of the stabilizing agent ranges from about 1 to about 5 parts by weight based on 100 parts by weight of the resin content in the water-soluble composition.

5. The method as claimed in claim 1, wherein said organic carboxylic is selected from the group consisting of formic acid, acetic acid and propionic acid.

6. The method as claimed in claim 1, wherein said stabilizing agent is selected from the group consisting of a carbonate, a formate, an acetate or a propionate of ammonia; a carbonate, a formate, an acetate or a propionate of a trialkylamine; a carbonate, a formate, an acetate or a propionate of an N-alkyldiethanolamine; a carbonate, a formate, an acetate or a propionate of an N,N-dialkylethanolamine; and a carbonate, a formate, an acetate or a propionate of triethanolamine.

7. The method as claimed in claim 6, said trialkylamine is trimethylamine or triethylamine.

8. The method as claimed in claim 6, said N-alkyldiethanolamine is N-methyldiethanolamine or N-ethyldiethanolamine.

9. The method as claimed in claim 6, wherein said N,N-dialkylethanolamine is N,N-dimethylethanolamine or N,N-diethylethanolamine.

10. The method as claimed in claim 1, wherein said water-soluble solvent is at least one compound represented by the general formula (a), (b), (c) or (d):
(a) R—OH
   wherein R represents a monovalent organic residue of an aliphatic or alicyclic compound having 3 to 8 carbon atoms;
(b) HO—R$_1$—OH
   wherein R$_1$ represents (1) a divalent organic residue of an aliphatic or alicyclic compound having 3 to 8 carbon atoms, or (2) a divalent moiety having the formula

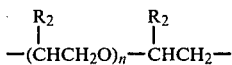

wherein n represents 0 to 5 and R$_2$ represents a hydrogen atom or a methyl group;
(c) R$_3$O—(CH$_2$CH$_2$O)$_m$—R$_4$
   wherein m represents 1 to 3, R$_3$ represents a lower alkyl group having 1 to 4 carbon atoms, and R$_4$ represents a hydrogen atom or a —OOCCH$_3$ group, or R$_3$ and R$_4$ are both methyl groups; or

wherein R$_5$ represents a glycerin or trimethylolpropane residue.

11. The method as claimed in claim 4, wherein said basic nitrogenous compound is selected from the group consisting of ammonia, ammonium hydroxide, tetraethylammonium hydroxide, tetramethylammonium hydroxide, trimethylamine, triethylamine, n-methylmorpholine, n-ethylmorpholine, pyridine, methylamine, ethylamine, diethylamine, dimethylamine, N-methyldiethanolamine, N-ethyldiethanolamine, N,N-dimethylethanolamine, N,N-diethylethanolamine, triethanolamine and mixtures thereof.

12. The method as claimed in claim 3, wherein said di-, tri- or tetravelent carboxylic acid is selected from the group consisting of succinic acid, glutaric acid, adipic acid, pimelic acid, suberic acid, azelaic acid, sebacic acid, maleic acid, hexahydrophthalic acid, phthalic acid, isophthalic acid, terephthalic acid, trimellitic acid, 4-carboxydiphenyl-3',4'-dicarboxylic acid, 4-carboxydiphenylmethane-3',4'-dicarboxylic acid, 3-carboxydiphenylmethane-3',4'-dicarboxylic acid, 4-carboxydiphenylether-3',4'-dicarboxylic acid, 3-carboxydiphenylether-3',4'-dicarboxylic acid, 4-carboxydiphenylketone-3',4'-dicarboxylic acid, 4-carboxydiphenylsulphone-3',4'-dicarboxylic acid, pyromellitic acid, 3,3',4,4'-diphenyltetracarboxylic acid, 3,3',4,4'-benzophenonetetracarboxylic acid, 3,3',4,4'-diphenylmethanetetracarboxylic acid, 3,3',4,4'-diphenylethertetracarboxylic acid, 3,3',4,4'-diphenylsulfonetetracarboxylic acid, 1,1-bis(2,3-dicarboxyphenyl)ethane, 2,2-bis(3,4-dicarboxyphenyl)propane, 1,2,5,6-naphthalenetetracarboxylic acid, cyclopentane-1,2,3,4-tetracarboxylic acid, the anhydrides thereof, the isomers thereof and the mixtures thereof.

13. The method as claimed in claim 1, wherein said diamine is selected from the group consisting of aliphatic, alicyclic and aromatic diamines represented by the formula H$_2$N—R—NH$_2$, where R represents a divalent organic group, and mixtures thereof.

14. The method as claimed in claim 1, wherein said stabilizing agent is the carbonate of the basic nitrogeneous compound.

15. The method as claimed in claim 1, wherein said stabilizing agent is selected from the group consisting of a formate, an acetate or a propionate of ammonia; a formate, an acetate or a propionate of a trialkylamine; a formate, an acetate or a propionate of an N-alkyldiethanolamine; a formate, an acetate or a propionate of an N,N-dialkyethanolamine; and a formate, an acetate or a propionate of triethanolamine.

16. The resin composition obtained on mixing
(a) a water-soluble resin composition prepared by condensation reacting an acid component consisting of 1,2,3,4-butanetetracarboxylic acid alone or a polycarboxylic acid component containing at least about 50 mol% of 1,2,3,4-butane tetracarboxylic acid and a diamine in the presence of a water-soluble solvent or, optionally in the presence of a water-soluble solvent and water, to obtain a condensation product having a residual acid value ratio of about 3 to about 50% of the acid value after condensation followed by formation of a salt of the condensation product with a basic nitrogenous compound; and
(b) about 0.01 to about 10 parts by weight based on 100 parts by weight of said component (a) of a stabilizing agent, said stabilizing agent, wherein said stabilizing agent is a carbonate, a formate, an acetate or a propionate of a basic nitrogenous compound selected from the group consisting of ammonia, a primary amine, a secondary amine, a tertiary amine, a heterocyclic compound which acts as a tertiary amine, a quaternary ammonium compound or a mixture thereof.

17. The composition of claim 16, wherein said stabilizing agent is the formate, acetate or propionate of said basic nitrogenous compound.

18. The composition of claim 17, wherein said stabilizing agent is selected from the group consisting of a formate, an acetate or a propionate of ammonia; a formate, an acetate or a propionate of a trialkylamine; a formate, an acetate or a proprionate of an N-alkyldiethanolamine; a formate, an acetate or a proprionate of an N,N-dialkylethanolamine; and a formate, an acetate or a proprionate of triethanolamine.

* * * * *